United States Patent
Touchton

(10) Patent No.: US 8,555,652 B1
(45) Date of Patent: Oct. 15, 2013

(54) AIR-INDEPENDENT INTERNAL OXIDATION

(75) Inventors: George Linton Touchton, Newark, CA (US); Amanda Touchton, legal representative, Los Angeles, CA (US)

(73) Assignee: Zere Energy and Biofuels, Inc., San Bruno, CA (US)

( * ) Notice: Subject to any disclaimer, the term of this patent is extended or adjusted under 35 U.S.C. 154(b) by 972 days.

(21) Appl. No.: 12/456,222

(22) Filed: Jun. 12, 2009

Related U.S. Application Data

(60) Provisional application No. 61/131,910, filed on Jun. 13, 2008.

(51) Int. Cl.
*F02G 3/00* (2006.01)
*F02C 6/00* (2006.01)

(52) U.S. Cl.
USPC .......... 60/775; 60/781; 60/39.464; 60/39.182

(58) Field of Classification Search
USPC ................. 60/775, 39.461, 39.464, 781, 783, 60/39.182
See application file for complete search history.

(56) References Cited

U.S. PATENT DOCUMENTS

| | | | |
|---|---|---|---|
| 4,343,624 A | 8/1982 | Belke et al. | |
| 5,339,754 A | 8/1994 | Lyon | |
| 5,447,024 A * | 9/1995 | Ishida et al. | 60/775 |
| 5,509,362 A | 4/1996 | Lyon | |
| 5,557,024 A | 9/1996 | Cheng et al. | |
| 6,143,203 A | 11/2000 | Zeng et al. | |
| 7,421,982 B2 | 9/2008 | Kamimura et al. | |
| 7,430,866 B1 | 10/2008 | Lynch et al. | |
| 7,767,191 B2 * | 8/2010 | Thomas et al. | 423/658 |
| 2005/0175533 A1 | 8/2005 | Thomas et al. | |
| 2008/0134579 A1 | 6/2008 | Kulkarni et al. | |
| 2008/0276803 A1 | 11/2008 | Molaison et al. | |
| 2009/0000194 A1 | 1/2009 | Fan et al. | |
| 2009/0020405 A1 | 1/2009 | Fan et al. | |

FOREIGN PATENT DOCUMENTS

| | | | |
|---|---|---|---|
| SE | 05002498 A | 8/2006 | |
| SE | 0900353 A | 10/2010 | |

* cited by examiner

*Primary Examiner* — Hoang Nguyen
(74) *Attorney, Agent, or Firm* — Lorraine S. Hirsch

(57) ABSTRACT

A chemical-looping combustion system is provided in which an oxygen carrier, for example a metallic oxide or peroxide, is used for fuel combustion and produces carbon dioxide and water as by-products. The system delivers steam and $CO_2$ at for direct utilization by steam cycle power generation equipment and heat exchangers. After fuel combustion, the oxygen-poor carrier is regenerated by exposure to air in a second, sequestered reactor. Choice of oxygen-carrier material and conditions allows for the fuel oxidizer reactor to run at temperatures greater than the running temperature of the regenerator reactor.

10 Claims, 3 Drawing Sheets

Air Independent Internal Oxidation
Plant Cycle Diagram

AIR-INDEPENDENT INTERNAL OXIDATION

CROSS REFERENCE TO RELATED APPLICATION

This application claims the benefit of U.S. Provisional Patent Application No. 61/131,910, filed Jun. 13, 2008, entitled "Air Independent Internal Oxidation," Inventor: George Linton Touchton, the disclosure of which is expressly incorporated herein by reference in its entirety.

FIELD OF THE INVENTION

The present invention relates to a steam turbine power generation plant system employing a chemical-looping combustion method and to the recovery and utilization of carbon dioxide by-products in the power generation plant system.

BACKGROUND OF THE INVENTION

Chemical-looping combustion (CLC) is a flameless combustion technology that requires no direct contact between air and fuel. CLC systems combust carbonaceous or hydrogen fuels by using a solid compound (typically a metal oxide) as an oxygen carrier. The metal oxide is circulated between two reactors: for combustion and regeneration.

In the combustion reactor, the fuel is oxidized by the oxygen carrier, which undergoes a corresponding reduction in the endothermic reaction. Because carrier-borne oxygen rather than air is used, it is sometimes called "air-independent oxidation."

The oxygen-depleted carrier is then regenerated in another reactor, typically by exposure to air. The exothermic regeneration process restores the carrier to an oxygen-rich state, enabling its reuse in combustion.

By-products from the combustion reactor are water and carbon dioxide. When the steam is condensed, a fairly pure stream of $CO_2$ is available for liquefaction, transport, and sequestration. The overall system function is similar to a conventional combustor, with the advantage that the output flow is free of nitrogen and excess oxygen. Because it does not require additional separation units, CLC technology avoids the energy penalty that traditional fossil fuel-fired combustors must pay to produce pure carbon dioxide. In addition, hot air from the regeneration reactor yields power through a thermodynamic cycle.

In alternatives to CLC using boilers, air is introduced by fans or other means to a combustion chamber. Fuel is also introduced to this chamber via pumps or other means. The chamber may be at or near atmospheric pressure or it may be pressurized. In the most common type of atmospheric boiler, just prior to entering the boiler combustion chamber, the air and the fuel are mixed in a burner.

The hot gases from combustion are nitrogen, carbon dioxide (the primary greenhouse gas or "GHG"), and water vapor along with pollutants such as nitrogen oxides formed from the extraneous nitrogen introduced with the oxygen needed for combustion (by volume air is 80% nitrogen and only 20% oxygen), sulfur oxides formed from fuel contaminants, and carbon monoxide due to incomplete combustion. The water vapor comes both from atmospheric humidity and from combustion. The water from combustion carries with it a portion of the fuel energy which can only be regained by condensing it to liquid.

The hot post-combustion gases are carried up by their buoyancy and pass through various heat exchange systems that boil the feedwater forming steam. Other heat exchange means superheat the steam. The cooled exhaust gases are then treated or exhausted to the atmosphere.

In an atmospheric fluidized bed boiler, the process is the same except that the fuel and air are mixed in, and combustion occurs in a bed of solids which is fluidized by their passage. A pressurized fluidized bed boiler is similar except that the entire process is contained in a pressure vessel, and the entering and exiting stream are pressurized. The pressurization reduces the volume of the gases and therefore the size of the equipment needed.

Existing external combustion boiler technologies have numerous problems and shortcomings, many related to extraneous nitrogen involved. The nitrogen: 1) requires major components (ducts, fans, the boiler itself, post combustion pollution treatment equipment) to be greatly oversized; 2) requires energy to supply it to the process (especially for a pressurized process); 3) carries energy away in the exhaust, as explained more fully below; and 4) results in pollutant (nitrogen oxides) formation.

"Oxy fuel" combustion is a prior art technology that partially addresses the issues of energy waste via exhaust. In this process, oxygen from an air separation plant is supplied to the combustion. Two types of air separation processes are cryogenic and pressure swing adsorption (PSA).

SUMMARY OF THE INVENTION

The system includes a condensing steam cycle (utilizing the fuel oxidation (FO) products) and a gas turbine cycle (utilizing the oxygen carrier regeneration (OCR) products (hot oxygen-depleted air). The combustion working fluid comprises steam and carbon dioxide: no air (and therefore no nitrogen) involved. A gaseous mixture of steam, carbon dioxide, and combustion products drives a power generation cycle with no admixed nitrogen or pollutants from nitrogen. After power production, the steam in the $CO_2$ mixture is condensed. This allows gaseous pollutants and greenhouse gases to be removed from the head space of the condenser for treatment and/or sequestration. For example $CO_2$, which is a greenhouse gas will be extracted from the working fluid, liquefied, and transported to DOE or state facilities for sequestration.

DETAILED DESCRIPTION OF THE PREFERRED EMBODIMENTS

Figure 1:
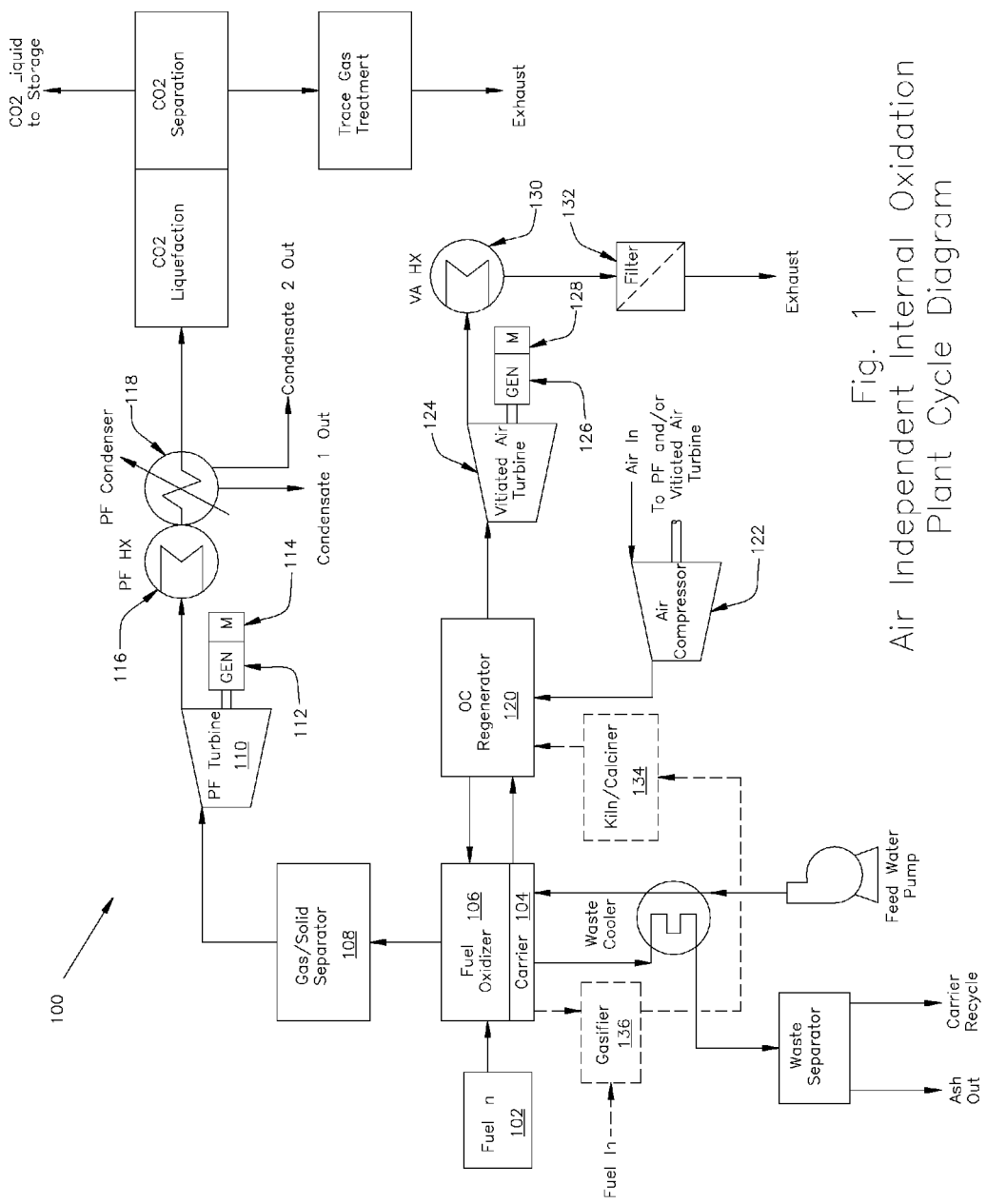
FIG. 1 is a schematic view of a chemical-looping combustion system in accordance with an embodiment of the present invention.

A dual-reactor chemical-looping combustion system 100, in accordance with an embodiment of the present invention, is shown in FIG. 1. In a preferred embodiment, a fuel 102, which may be in a partially or fully gasified state, is mixed with an oxygen-rich oxygen carrier (typically a metallic oxide or peroxide) in a fluidized bed 104 in a fuel oxidizer 106, as depicted in FIG. 1. (For convenience in drawing, the oxygen carrier is labeled as included in a bed. In alternatives, the oxygen carrier may be in a non-bed form.) The fuel can be any solid, liquid, or gaseous fuel comprised of hydrogen and/or carbon, including coal, natural gas, bio-fuels, land fill gas, and industrial waste gas. The reactions in reactors typically take place at temperatures less than or equal to 1300 degrees C.

Fuel oxidizer 106 is also called an oxidation chamber. A feedwater pump 103 delivers water to fuel oxidizer 106 for steam production. Carrier 104 oxidizes the fuel and converts its chemical energy to heat. This released heat in turn raises the temperature of the desired gaseous products, steam and carbon dioxide. The gaseous products (off gas) then go through a gas-solid separator 108 to separate out any solid particles, and are then delivered to a steam turbine 110. In one embodiment, steam turbine 110 is part of a Rankine cycle steam turbine system. A power generator 112 captures power from the steam turbine and a motor 114 supplies power for start up. The process flow continues through a heat exchanger 116 and a condenser 118. Condensates are released from the condenser, and $CO_2$ continues for liquefaction, separation, and/or storage. Trace gases are treated before being exhausted.

In fuel oxidizer 106, oxygen carrier 104 is mixed with fuel 102. As a result of this mixing, the fuel is oxidized to steam, carbon dioxide, and hydrogen (or other carbon- or hydrogen-containing material) and releases heat into the bed, the circulating gas/solid flow, and the oxidation products. Part of the fuel combustion oxidation reaction is internal oxidation. More heat is made available when the combustion is exothermic, and the internal oxidation appears to drive the fuel combustion reaction towards being exothermic.

A mixture of steam, $CO_2$, oxidation products, and solids is circulated in fuel oxidizer 106. The circulating solids can include oxygen-poor (reduced) metallic oxide or other oxygen carrier that has been reduced in the process of oxidizing the fuel. (In this application, the terms "oxygen-rich" and "oxygen-poor" are relative terms referring to the oxygenation state of the carrier.)

After the oxygen carrier has been reduced by oxidizing the fuel, it is sent to an oxygen-carrier regenerator 120. The heart of the CLC system is sending the alternately oxygen-rich and oxygen-poor carrier between the fuel oxidizer and the regenerator for respective fuel combustion and carrier regeneration. The depleted carrier is regenerated in regenerator 120 by means of air supplied by an air compressor 122. Vitiated (oxygen-depleted) air (second off-gas) is then passed from regenerator 120 to a vitiated air turbine 124. Vitiated air turbine 124 is connected to a generator 126 for power generation and motor 128 for start up. The vitiated air continues to a heat exchanger 130, and from there to a filter 132 which removes particles before exhaust.

In an alternative used, for example, with a carrier such as barium oxide/barium peroxide, a calciner 134 is arranged to receive oxygen-poor carrier, calcine it, and transfer off gas to fuel oxidizer 106 and depleted carrier (e.g., barium oxide) to regenerator 120. Calciner 134 is shown in dashed lines because it is optional and not used with all carriers. An optional gasifying reactor 136 (also shown in dashed lines) receives solid products and contacts them with fuel.

In a preferred embodiment, the oxygen carrier (typically metallic oxide/peroxide) is such that regeneration occurs at a low temperature relative to the fuel oxidation step and is exothermic (gives up heat to the process). In other reactions and carriers, this reaction may be exothermic or endothermic. In the endothermic case, the heat absorbed from the cycle is recovered when the oxygen carrier decomposes to the oxide and oxygen in the fuel oxidation step. In the exothermic case, the heat given up to the cycle will be utilized to pre-heat feedwater, generate additional steam or hot water for end use, or the like.

In a preferred embodiment, copper oxide (CuO) is the oxygen carrier. In an alternative preferred embodiment, the oxygen carrier is barium oxide or barium peroxide. Other oxygen carriers are strontium/oxide peroxide, $Fe_2O_3/FeO$, and $Mn_3O_4/MnO$ (from here on they will be referred to as "metallic oxides/peroxides").

The complete fuel-combustion/regeneration cycle is:

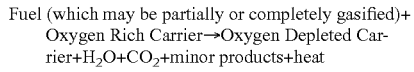

Fuel (which may be partially or completely gasified)+ Oxygen Rich Carrier→Oxygen Depleted Carrier+$H_2O$+$CO_2$+minor products+heat In some embodiments, this part of the cycle is highly exothermic after including the heat absorbed as the peroxide decomposes into the oxide. The oxidation reaction is an internal reaction and all the heat released is available for downstream conversion to electrical/heat energy including the heat absorbed by $H_2O$ formed in the fuel oxidation. As those skilled in the art are aware, internal oxidation includes the formation of oxides beneath the surface of a metal or metallic compound, such as the metals, metallic oxides, and metallic peroxides used as oxygen carriers in the present invention. The internal oxidation process saves 8-20% of the energy which is lost with the exhaust gases in a conventional boiler. Another 5-10% (depending on the fuel) of fuel energy trapped with the $H_2O$ formed in the oxidation (combustion) step is exhausted from conventional boilers, but available to the AIIOSG cycle The cycle is closed by regenerating the carrier, e.g., peroxide from the oxide or oxide from the metal:

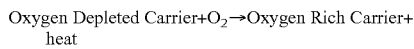

Oxygen Depleted Carrier+$O_2$→Oxygen Rich Carrier+ heat where, for example, the carrier can include $BaO/BaO_2$, $SrO/SrO_2$, $FeO/Fe_3O_3$, $MnO/Mn_3O_4$, $Cu/CuO$, $Ni/NiO$. In some embodiments, including barium oxide and peroxide, the carrier is calcined before being looped back into the fuel oxidizer.

The CLC system in accordance with the present invention offers many advantages over the prior art. In particular, it can produce electric and/or heat energy with zero gaseous pollutant and greenhouse gas (GHG) emissions, produce steam and/or $CO_2$ in an air independent oxidation process by delivering oxygen to said process via a chemical carrier, produce power using a carrier gas—preferably steam and carbon dioxide using internal combustion/oxidation, produce energy with increased efficiency, and utilize a wide variety of liquid, solid, and gas fuels separately or in combination—including but not limited to biomass fuels, hydrogen, fossil fuels and partially or completely gasified solid or liquid biomass and fossil fuels.

A CLC system in accordance with an embodiment of the present invention can also regenerate (oxidize) the spent chemical carrier in air completing the loop, deliver steam and $CO_2$ for direct utilization by existing steam cycle power generation equipment and heat exchangers, deliver steam and $CO_2$ and oxygen-depleted air for direct use by gas turbine power generation equipment to supply heat, deliver steam, $CO_2$ and oxygen-depleted air to exchange heat and indirectly supply steam for high pressure steam cycle power generation, and reduce costs and minimize time to market by utilize existing pressurized fluid bed, gasification, and chemical process components to realize the Air Independent Internal Oxidation Steam Generation (AIIOSG) system.

Conditions in the oxidation step such as temperature, pressure, and residence time will be chosen by methods known to those skilled in the art, to prevent the formation of unwanted compounds. During the oxidation process, there is an unavoidable mix of carbon (with the exception of hydrogen fuel), hydrogen, oxygen, and steam in the oxidation zone. The major unwanted species formed by side reactions are metallic hydroxides and carbonates. These compounds rob energy from the process and lock it up. They are difficult to separate from the desired products and difficult to handle.

In a preferred embodiment, side reaction products such as carbonates and hydroxides are reduced to the metal or the metal oxide, preparing the oxygen carrier to react with the oxygen in air. In the oxide/peroxide embodiment, the side reaction products are reduced to the oxide. Simultaneously, the fuel is partially or completely gasified. This process produces no nitrogen oxides or nitrates and reduces hydroxides, carbonates, and other side reaction products to negligible amounts. In the preferred embodiment the partial pressure of the gaseous products from this step will be reduced by flowing an inert gas at high volume through the reactor or by physical means such as pumps.

Figure 2:
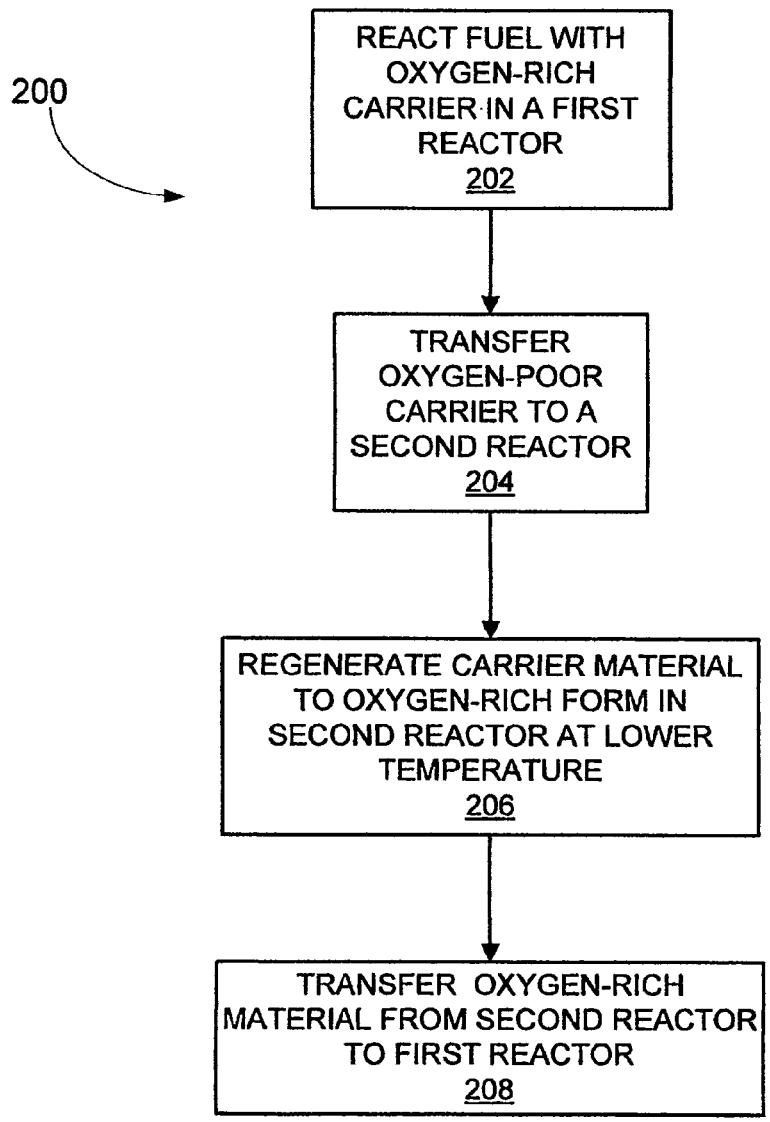
FIG. 2 is a flow chart of a method in accordance with an embodiment of the present invention.

A method 200 in accordance with an embodiment of the present invention is depicted in FIG. 2. At a step 202, a carbonaceous or hydrogen fuel is reacted within a first reaction-temperature range with a material in an oxygen-rich form in a first fuel-oxidizer reactor to convert the material to an oxygen-poor form and to produce a first off gas containing carbon dioxide and water. At a step 204, the carrier material in its oxygen-poor form is transferred to a second carrier-regenerator reactor. At a step 206, air is introduced into the second reactor for reaction within a second reaction-temperature range with the carrier material in its oxygen-poor form to convert the carrier material to its oxygen-rich form, the highest level of said second reaction-temperature range being less than or equal to the lowest level of the first reaction-temperature range. At a step 208, carrier material in its oxygen-rich form is transferred from the second reactor to the first reactor.

In an alternative embodiment, at an alternative step 206, the carrier material is regenerated to an oxygen-rich form in the second reactor, the highest point of the operating temperature range of the second reactor being equal to the lowest point of the operating temperature range of the first reactor.

Figure 3:
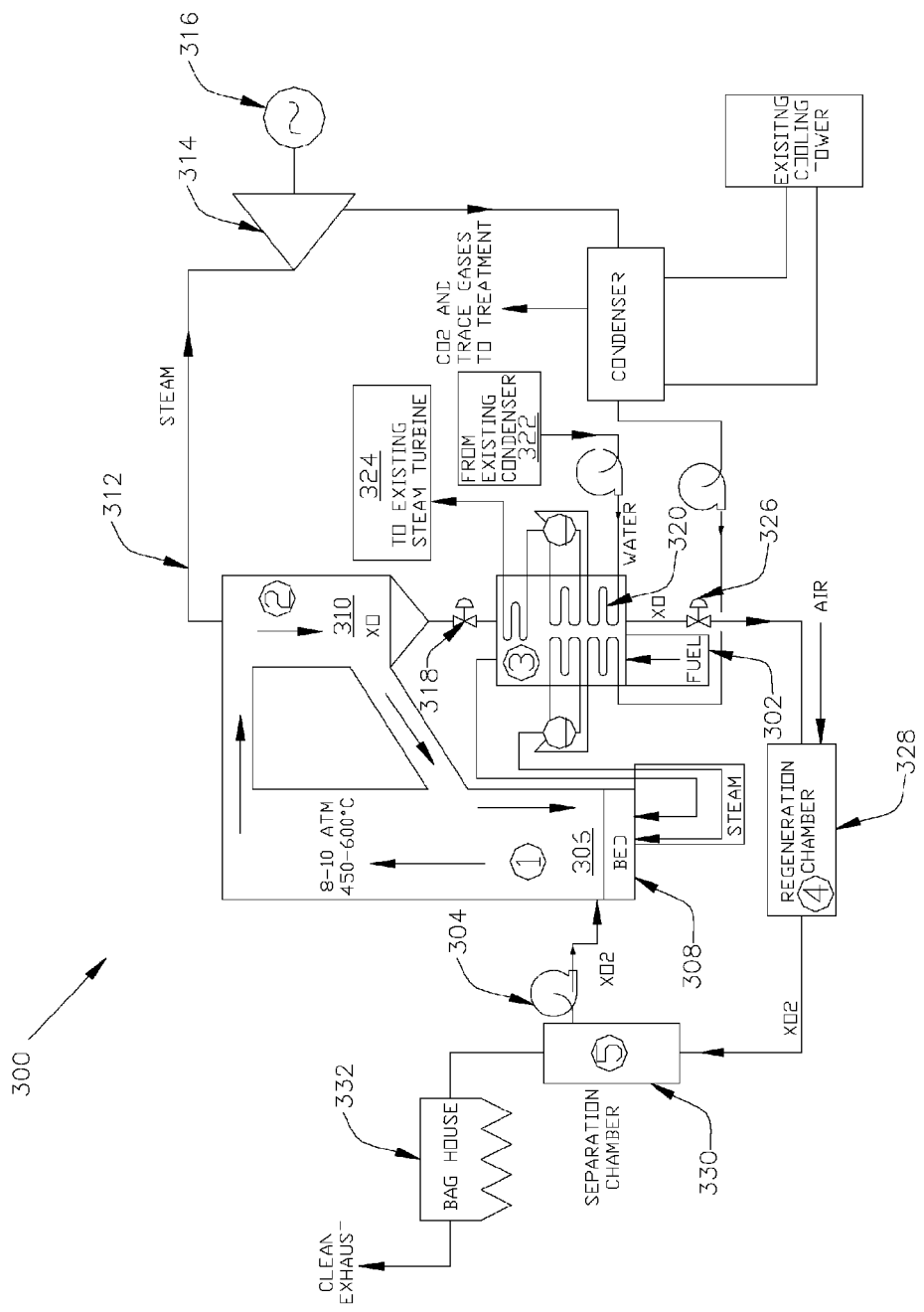
FIG. 3 is a schematic view of a chemical-looping combustion system in accordance with an alternative embodiment of the present invention.

An alternative embodiment of a chemical-looping combustion system 300 is shown in FIG. 3. In an alternative embodiment shown in FIG. 3, partially gasified fuel 302 and steam enters a fluidized bed oxidation chamber 306 and are mixed with the oxygen carrier material, such as a metallic oxide or peroxide. In the schematic view, the metallic oxide is included in the fluidized bed, so is schematically indicated by numeral 308. As a result of this mixing, the fuel is oxidized to carbon dioxide and steam and releases heat into the bed, the circulating gas/solid flow, and the oxidation products. A mixture of steam and/or $CO_2$, oxidation products, and solids is circulated in recirculation chamber 310. The circulating solids include oxygen-poor metallic oxide as a result of oxidizing the fuel. Steam and gaseous oxidation products are extracted from the upper section of the recirculation chamber, as indicated schematically by a steam arrow 312, and flow to a low-pressure, high-temperature steam turbine system, driving a turbine 314 and producing power, indicated schematically by a generator 316.

The solids in recirculation chamber 310 flow downward, and a portion of these solids are let down through a double valve lock hopper 318 into a chamber 320, which contains a carrier-reducing (fuel rich) atmosphere at a low pressure. Any metallic carbonates and hydroxides are reduced to oxides and the fuel is partially oxidized to hydrogen, carbon monoxide, steam, and/or $CO_2$.

In chamber 310, heat from the circulating solids is transferred to two saturated water flows. The first is the process flow, which is raised to the saturated steam temperature corresponding to the process pressure. The second is the flow from a condenser 322. This flow is raised to the saturated steam temperature corresponding to the inlet pressure of a steam turbine 324 and then super heated to the inlet temperature of that turbine. This steam then flows through the system (steam turbine, feedwater heaters, and condenser) driving the connected generator and producing power.

The solids are conveyed from chamber 320, through a lock hopper system 326, and into a regeneration chamber 328. Here the metallic oxide reacts with the oxygen in the air, regenerating the peroxide. Regeneration takes place at a temperature less than or equal to that of the combustion reactor and an elevated pressure. Temperatures and pressures will be chosen to ensure that no nitrogen compounds such as nitrogen oxides and nitrates are formed. The regenerated peroxide is conveyed by the vitiated air into the separation chamber 330. Any entrained fine particles are collected in the bag house 332. The regenerated oxygen carrier is conveyed into the bed 308, completing the cycle.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to those preferred aspects of the invention.

What is claimed is:

1. A power-generation method comprising:
reacting within a first reaction-temperature range a carbonaceous or hydrogen fuel with a material in an oxygen-rich form in a first reactor to convert said material to an oxygen-poor form and to produce a first off gas containing carbon dioxide and water;
transferring said material in its oxygen-poor form to a second reactor;
introducing air into said second reactor for reaction within a second reaction-temperature range with said material in its oxygen-poor form to convert said material to its oxygen-rich form and to produce a second off gas, the highest level of said second reaction-temperature range being less than the highest level of said first reaction-temperature range; and
transferring said material in its oxygen-rich form from said second reactor to said first reactor.

2. A method as recited in claim 1 further comprising
passing said first off gas through a steam-condensing turbine to drive said steam-condensing turbine; and
passing said second off gas through a gas turbine.

3. A method as recited in claim 1 wherein said first reaction-temperature range is below 1300 C.

4. A method as recited in claim 1 wherein said oxygen-poor form of said material consists predominantly of copper, manganese, and barium oxide or some combination or subset thereof.

5. A power-generation method comprising:
reacting within a reaction-temperature range a carbonaceous or hydrogen fuel with a material in an oxygen-rich form in a first reactor to convert said material to an oxygen-poor form and to produce a off as containing carbon dioxide and water;
transferring said material in its oxygen-poor form to a second reactor;

introducing air into said second reactor for reaction within a second reaction-temperature range with said material in its oxygen-poor form to convert said material to its oxygen-rich form and to produce a second off gas, the highest level of said second reaction-temperature range being less than the highest level of said first reaction-temperature range;

transferring said material in its oxygen-rich form from said second reactor to said first reactor; and a third reactor arranged to receive the solid product from said first reactor and contact it with the fuel to reduce at least a portion of the barium carbonate and barium hydroxide to barium oxide and to partially oxidize and gasify at least part of the fuel to a carbonaceous fuel and hydrogen, with said fuel and hydrogen then transferred to said first reactor.

6. A system as recited in claim 5 further comprising:

a steam-condensing turbine coupled to said first reactor for receiving said first off gas; and a gas turbine coupled to said second reactor for receiving said second off gas.

7. A system as recited in claim 5 wherein said oxygen-poor form of said material consists predominantly of copper, manganese, and barium oxide or some combination or subset thereof.

8. A power-generation method comprising:

reacting within a reaction-temperature range a carbonaceous or hydrogen fuel with a material in an oxygen-rich form in a first reactor to convert said material to an oxygen-poor form and to produce a off gas containing carbon dioxide and water;

transferring said material in its oxygen-poor form to a second reactor;

introducing air into said second reactor for reaction within a second reaction-temperature range with said material in its oxygen-poor form to convert said material to its oxygen-rich form and to produce a second off gas, the highest level of said second reaction-temperature range being less than the highest level of said first reaction-temperature range;

transferring said material in its oxygen-rich form from said second reactor to said first reactor; and a third reactor arranged to receive the solid product from said first reactor and contact it with the fuel to reduce at least a portion of the barium carbonate and barium hydroxide to barium oxide and to partially oxidize and gasify at least part of the fuel to a carbonaceous fuel and hydrogen, with said fuel and hydrogen then transferred to said first reactor.

9. A system as recited in claim 8 with a fourth reactor arranged to receive the solid product from said third reactor and calcine all remaining barium carbonate and barium hydroxide to barium oxide and produce an off gas of steam and carbon dioxide, said off gas then transferred to said first reactor and said barium oxide transferred to said second reactor.

10. A method as recited in claim 1 wherein when the carrier material is regenerated to an oxygen-rich form in the second reactor, the highest point of the operating temperature range of the second reactor is equal to the lowest point of the operating temperature range of the first reactor.

* * * * *